United States Patent [19]

Sota

[11] Patent Number: 5,413,290

[45] Date of Patent: May 9, 1995

[54] TAPE WINDING APPARATUS

[75] Inventor: Koichi Sota, Chofu, Japan

[73] Assignee: Otari Inc., Chofu, Japan

[21] Appl. No.: 137,620

[22] Filed: Oct. 15, 1993

[30] Foreign Application Priority Data

Dec. 25, 1992 [JP] Japan .................. 4-346576

[51] Int. Cl.⁶ ............................................ B65H 18/00
[52] U.S. Cl. .................................................. 242/532.1
[58] Field of Search .................... 242/56 R, 58.1, 58.4, 242/58.5, 532.1, 527

[56] References Cited

U.S. PATENT DOCUMENTS

| | | | |
|---|---|---|---|
| 4,332,355 | 6/1982 | Zopfy et al. | 242/56 R |
| 4,519,553 | 5/1985 | Campbell et al. | 242/56 R |
| 4,572,450 | 2/1986 | Lindquist | 242/56 R |
| 4,629,138 | 12/1986 | Kubo | 242/56 R |
| 4,690,346 | 9/1987 | Takeda et al. | 242/56 R |

FOREIGN PATENT DOCUMENTS 62-97188 5/1987 Japan .

Primary Examiner—Daniel P. Stodola
Assistant Examiner—John P. Darling
Attorney, Agent, or Firm—David O'Reilly

[57] ABSTRACT

A tape winding apparatus in which a leader tape is pulled out of a cassette supplied to a tape winding station and cut. The cut end of the leader tape is plied to the leading end of a working tape, and the working tape is wound into the cassette by rotating a hub in the cassette. The tape winding apparatus has a plurality of tape winding stations on the same plane and a moving apparatus to move the leading end of the working tape to a position adjacent to the cut end of the leader tape of a cassette selected from a plurality of cassette supplied to the plurality of tape winding stations.

3 Claims, 4 Drawing Sheets

TAPE WINDING APPARATUS

SPECIFICATION

1. Field of the Invention

The present invention relates to a tape winding apparatus for winding a working tape into a cassette having a leader tape contained therein. More particularly, it concerns a tape winding apparatus for winding a working tape supplied from one place into two or more cassettes.

2. Background Information

A cassette having a working tape, such as a magnetic tape or a ribbon tape, wound therein is fabricated by a tape winding apparatus. There have been developed several types of tape winding apparatuses. One previous type of apparatus operates to wind a working tape into the cassette having a leader tape connected to a pair of hubs.

The previous type of tape winding apparatus, first, pulls the leader tape out of the cassette before cutting it, splices one of the cut ends with the leading end of a long magnetic tape, and rotates the hub to wind the magnetic tape into the cassette. After winding a predetermined length of magnetic tape, the previous apparatus cuts the magnetic tape, splices the cut end with the other cut end of the leader tape, and finally winds the magnetic tape into the cassette leaving the leader tape out of the cassette.

However, the previous type of apparatus has a critical problem with the cycle time for producing one volume of cassette. In order to shorten the cycle time, there have been many prior methods. One of the prior methods was disclosed in Japanese Patent Application Laid-Open 62-97188. The apparatus of this method is constructed to shorten the preparation time in a way that has two cassettes retained on a turn table, with one cassette having tape wound thereinto while the other is being prepared for winding.

Another prior method was disclosed in U.S. Pat. No. 4,332,355. The apparatus of this method is constructed to have two cassettes overlap in parallel on a base plate and two tape winding shafts engageable with the respective hubs from opposite directions. While one cassette is winding a magnetic tape thereinto, the other cassette has a leader tape pulled out thereof and cut. After being wound up in the former cassette, the magnetic tape is cut. The magnetic tape is then spliced with the leader tape of the latter cassette and wound into the latter cassette. At the same time, the leader tape pulled out of the former cassette is wound into the cassette. This completes the cassettes. As explained above, the apparatus has winding, preparation, and post-process steps that proceed successively and in parallel.

However, the prior tape winding apparatus with the turn table has problems as the two cassettes are held on the turn table. It is not only complicated in construction of the turn table and the construction for turning it, but also the turn table has to be made too large to turn in short time. As a result, the effect of shortening the cycle time is reduced.

The prior tape winding apparatus having two cassettes overlapping in parallel on a base plate has a problem that the cassettes are held in positions that are deviated from the direction of the running magnetic tape in parallel with the base plate. As a result, the magnetic tape is distorted during running, and may be damaged. In order to avoid the damage, the cassettes must be moved. But, the moving arrangement causes the apparatus construction to become very complicated.

SUMMARY OF THE INVENTION

Accordingly, it is an object of the present invention to provide a tape winding apparatus capable of shortening the cycle time with a simpler construction and without damaging a tape.

Briefly, the foregoing object is accomplished in accordance with the aspects of the present invention. In the tape winding apparatus, a leader tape is pulled out of a cassette supplied in a tape winding station and cut. The cut end of the leader tape is spliced with the leading end of a working tape, and the working tape is wound into the cassette by a hub revolving in the cassette. In the apparatus, a plurality of tape winding stations are provided on the same plane. Also, moving means is provided for moving the leading end of the working tape to a position facing the cut end of the leader tape of any cassette selected from the plurality of cassettes supplied in a plurality of tape winding stations.

A leader tape is pulled out of one of the cassettes supplied to a plurality of tape winding stations before and cut. The moving means selects one of the cassettes in the plurality of tape winding stations and moves a leading end of a working tape to the cut end of the leader tape of the cassette. As the plurality of tape winding stations are mounted on the same plane, the working tape is moved parallel to its running direction. The working tape is then spliced with the leader tape and is wound into the cassette. While winding, a leader tape is pulled out of a cassette at another tape winding station and cut.

The tape winding apparatus of the present invention has the plurality of tape winding stations provided on the same plane. While any one of the tape winding stations is winding a working tape into the cassette, another tape winding station is making preparation and post-processing, such as pulling the leader tape out of the cassette and cutting it. The moving block moves the leading end of the working tape parallel to the base plate to a selected tape winding station. In such a simple construction and operation, the tape winding apparatus of the present invention not only can shorten the cycle time, but also can wind the working tape without damaging it. This means that the working tape can be neatly wound in the cassette as its edges can be well aligned.

Also, the tape winding apparatus of the present invention can further shorten the cycle time as it can be constructed so as to have three or more tape winding stations on the same plane to portion out different work to the stations.

Further, the tape winding apparatus of the present invention can even shorten the cycle time for video tape and similar cassettes in which the plurality of tape winding shafts can be engaged only in one direction. The reason for this is that the apparatus can be constructed so that the plurality of tape winding stations are placed on the same plane to allow the tape winding shafts to be engaged in the same direction.

Other objects and advantages of the invention will become apparent from the following portion of this specification and from the accompanying drawings.

DESCRIPTION OF THE PREFERRED EMBODIMENTS

Figure 1:
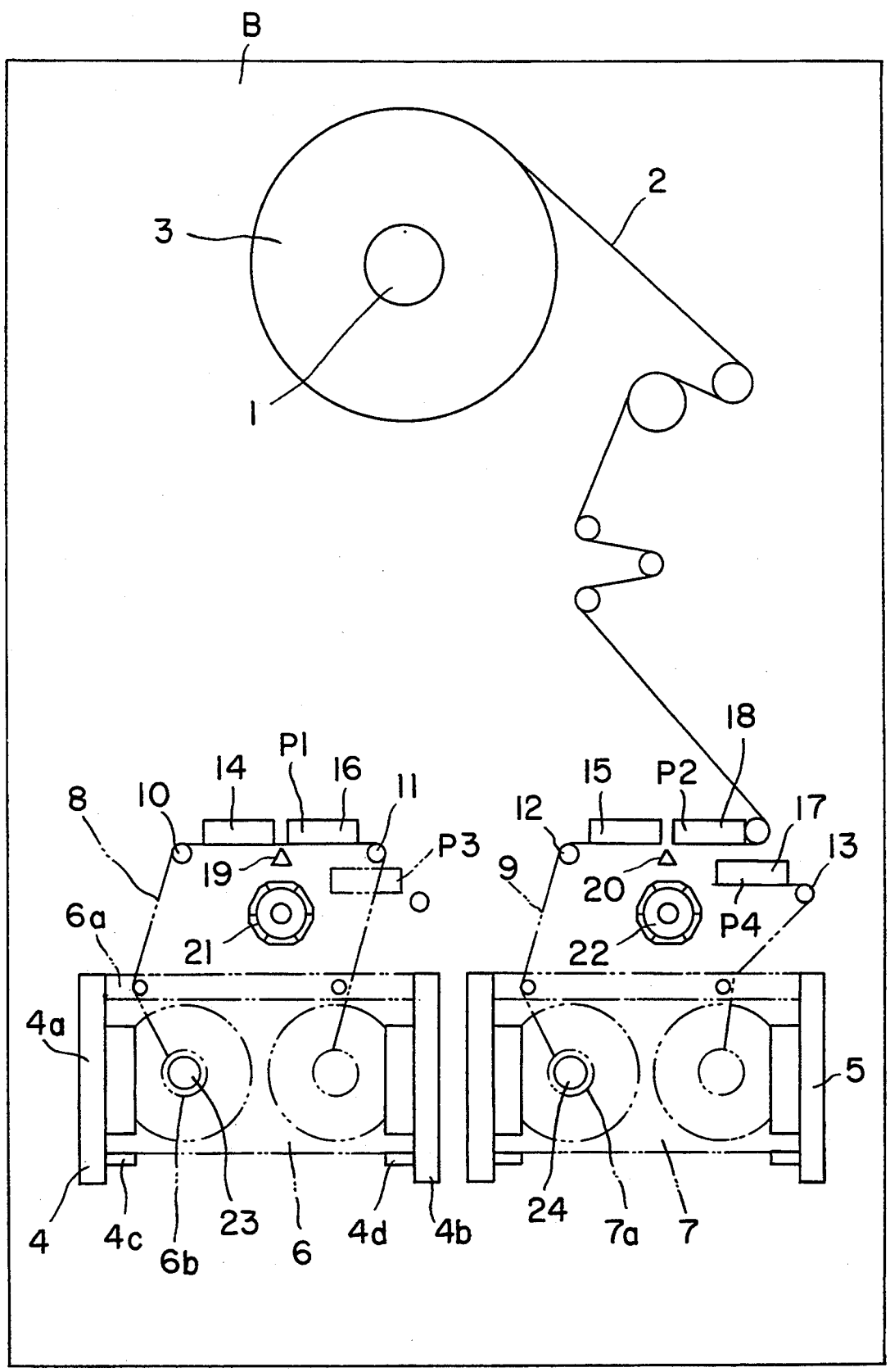
FIG. 1 is an overall schematic representation of an illustrative embodiment of the present invention for a tape winding apparatus.
Figure 2:
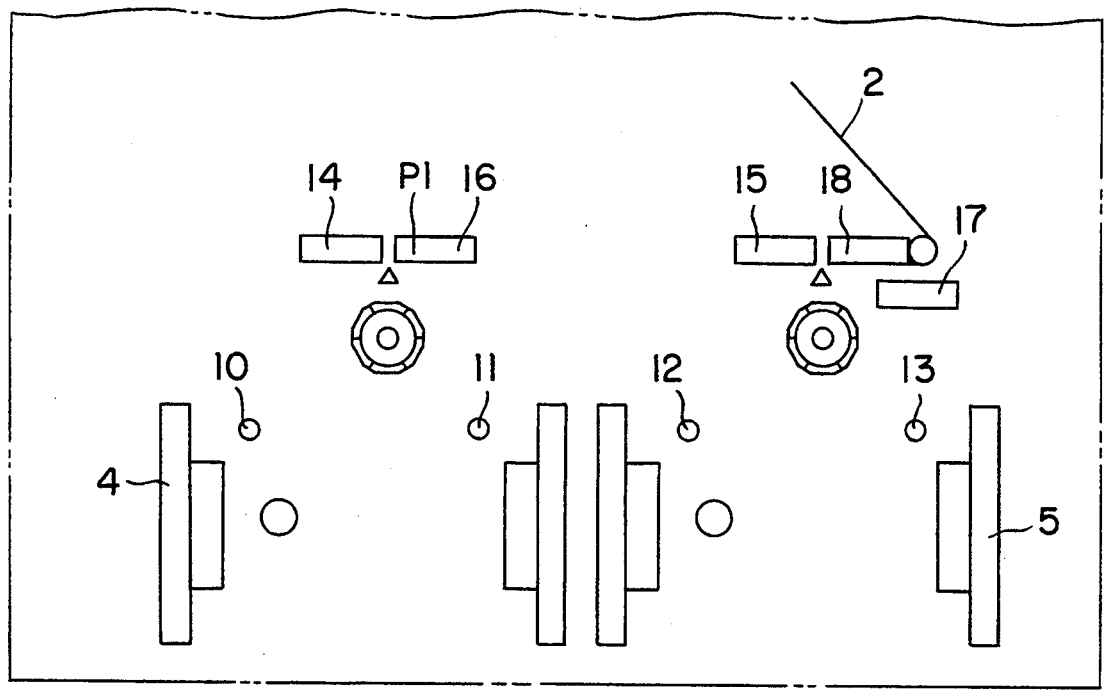
FIG. 2 is a view illustrating operation of the present invention.

The following describes an embodiment of the present invention with reference to the accompanying drawings. FIG. 1 is an overall schematic representation of an illustrative embodiment of the present invention for a tape winding apparatus.

Reel rest 1 provided on a top of base plate B supplies long magnetic tape 2 as tape reel 3 of magnetic tape 2 is rotated.

Two cassette holders or tape winding stations 4 and 5 are installed on base plate B to retain receiving cassettes 6 and in place, respectively. In FIG. 1, cassette holder 4 has side plates 4a and 4b to restrict cassette 6 on each of the right and left sides of which is a groove, and has pins 4c and 4d which can project from or retract into side plates 4a and 4b to support the bottom of a cassette, thereby holding cassette 6.

Cassette holder 4 has cassette 6 inserted between side plates 4a and 4b from a downward or upward direction on the plane of the figure by cassette supplying means (not shown). Cassette 6 is retained by pins 4c and 4d projecting inward. Cassette holder 4 can freely drop cassette 6 down to unload it if pins 4c and 4d are retracted into side plates da and 4b respectively.

Cassette holder 4 may also be vertically moved above or below base plate B. If cassette holder 4 is moved down to base plate B, lid 6a of cassette 6 is opened by a pin (not shown) to expose a leader tape 8. Cassette holder 5 is constructed like cassette holder 4.

Tape pull-out rollers 10, 11 and 12, 13 provided for two cassette holders 4 and 5 consist of guide rollers and an arrangement (not shown) which moves the guide rollers relative to the plane of the figure. When moving cassettes G and 7 onto base plate B, tape pull-out rollers 10, 11, 12 and 13 are inserted into cassettes 6 and 7 respectively at the same time that lid 6a is opened with cassette 4 and 5. The rollers are moved upward to base plate B to pull leader tapes 8 and 9 out.

Fixed blocks 14 and 15 and sliding blocks 16 and 17 provided for cassette holders 4 and 5 are formed with grooves (not shown), respectively.

Each of the grooves has a multiplicity of holes connected with a negative pressure source to attract the magnetic tape or the like. Fixed blocks 14 and 15 are held on base plate B. Sliding blocks 16 and 17 are placed at positions P1 and P2 facing fixed blocks 14 and 15 or moved to positions P3 and P4 on the sides of cassette holders 4 and 5, respectively.

Moving block 18 is a moving means which has a structure for attracting the tape similar to fixed block 15 to attract and hold a leading end of magnetic tape 2 supplied from tape reel 3. Moving block 18 is moved parallel to base plate B between positions P1 and P2 by a moving arrangement (not shown).

Each of cutting means 19 and 20 consists of a cutting blade and a moving arrangement (not shown) for vertically reciprocating the cutting blade relative to base plate B. Cutting means 19 and 20 can cut leader tape 8 and 9 or magnetic tape 2 attracted between fixed blocks 14 and 15 and on sliding blocks 16 and 17 or moving block 18 at positions P1 or P2.

Each of tape splicing means 21 and 22 can cut a splicing tape (not shown) to a predetermined length and splice it to leader tapes 8 and 9 with magnetic tape 2. That is, splice the tape attracted on fixed blocks 14 and 15 with the tape attracted on sliding blocks 16 and 17 or moving block 18 at positions P1 and P2. Alternatively, each of cutting means 19 and 20 and each of tape splicing means 21 and 22 may be combined into a single device, which is moved by n moving arrangement to the respective positions where the cutting or splicing is done.

Each of tape winding shafts 23 and 24 provided for respective cassette holders 4 and 5 are inserted to engage the center holes of hubs 6b and 7a contained in cassettes 6 and 7. Tape winding shafts 23 and 24 are rotated by a motor (not shown) to rotate hubs 6b and 7a. The insertion is performed as cassette holders 4 and 5 are moved to base plate B.

Operation of the tape winding apparatus of the present invention constructed as explained, is described below with reference to FIGS. 2 to 7. The figures are views to illustrate operation of the invention.

In the initial state, the leading end of magnetic tape 2 is unwound from tape reel 3 and kept attracted to moving block 18. Sliding block 16 is at position P1. Tape pull-out rollers 10, 11, 12, and 13 are positioned under the plane of FIG. 2.

In the position stated above, one cassette holder 4 holds receiving cassette G. Cassette holder 4 is then moved to base plate B to open lid 6a of cassette 6, and tape pull-out rollers 10 and 11 are inserted into cassette 6. At the same time, tape winding shaft 23 engages width hub 6b of cassette 6.

Figure 3:
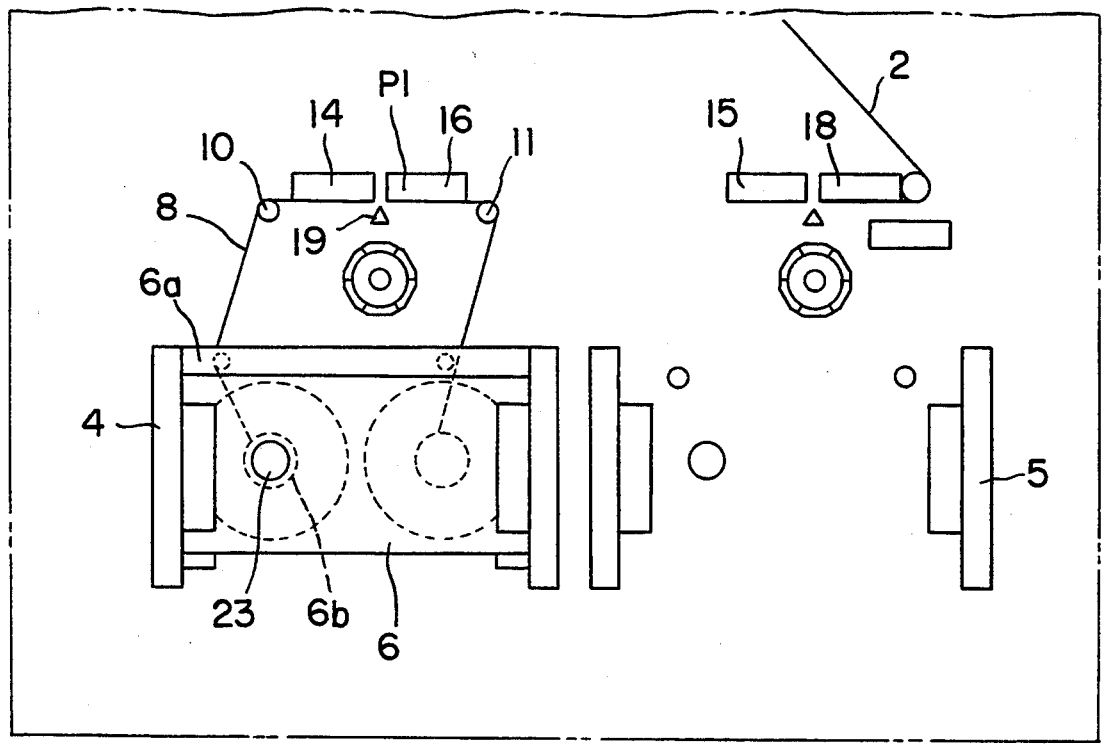
FIG. 3 is another view illustrating operation of the present invention.

Tape pull-out rollers 10 and 11 then move upward in the plane of the figure to pull leader tape 8 out of cassette 6. Fixed block 14 and sliding block 16 attract and hold leader tape 8. Cutting device 19 cuts attracted leader tape 8 (FIG. 3).

Figure 4:
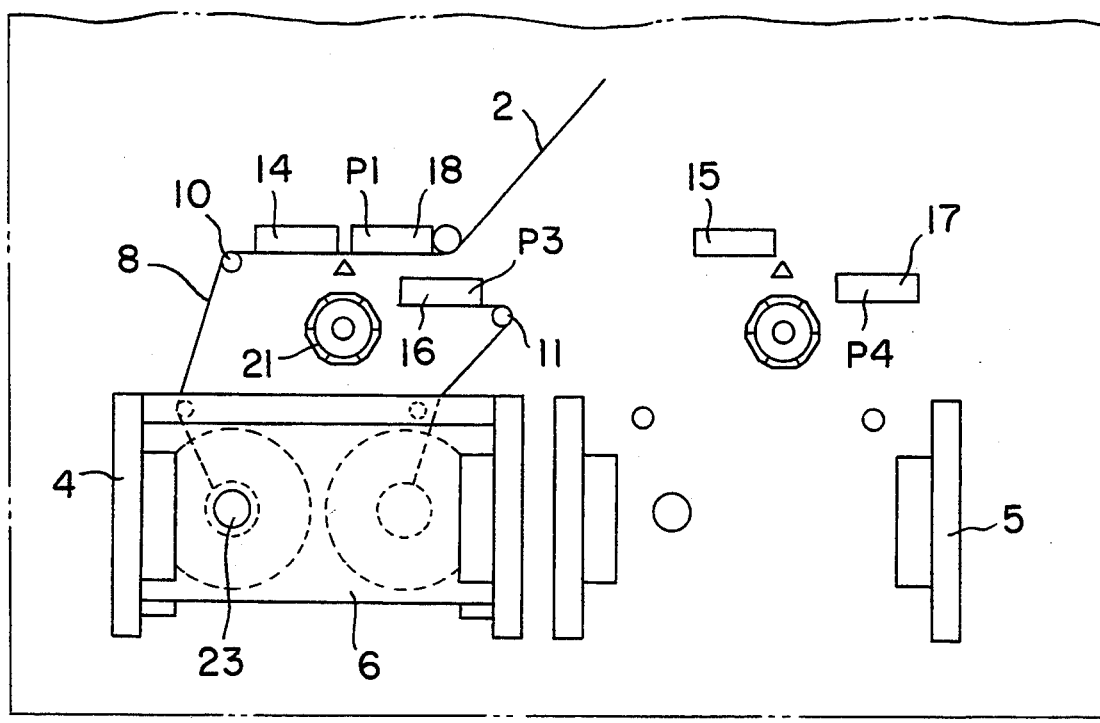
FIG. 4 is still another view illustrating operation of the present invention.

Sliding block 16 in turn, is moved to position P3 and moving block 18 is moved to position P1. Magnetic tape 2 and leader tape 8 are aligned in this way and are spliced together by tape splicing means 21 (FIG. 4).

Fixed block 14 and moving block 18 then release the attraction of leader tape 8 and magnetic tape 2. Tape winding shaft 23 is then rotated to wind magnetic tape 2 into cassette 6.

Figure 5:
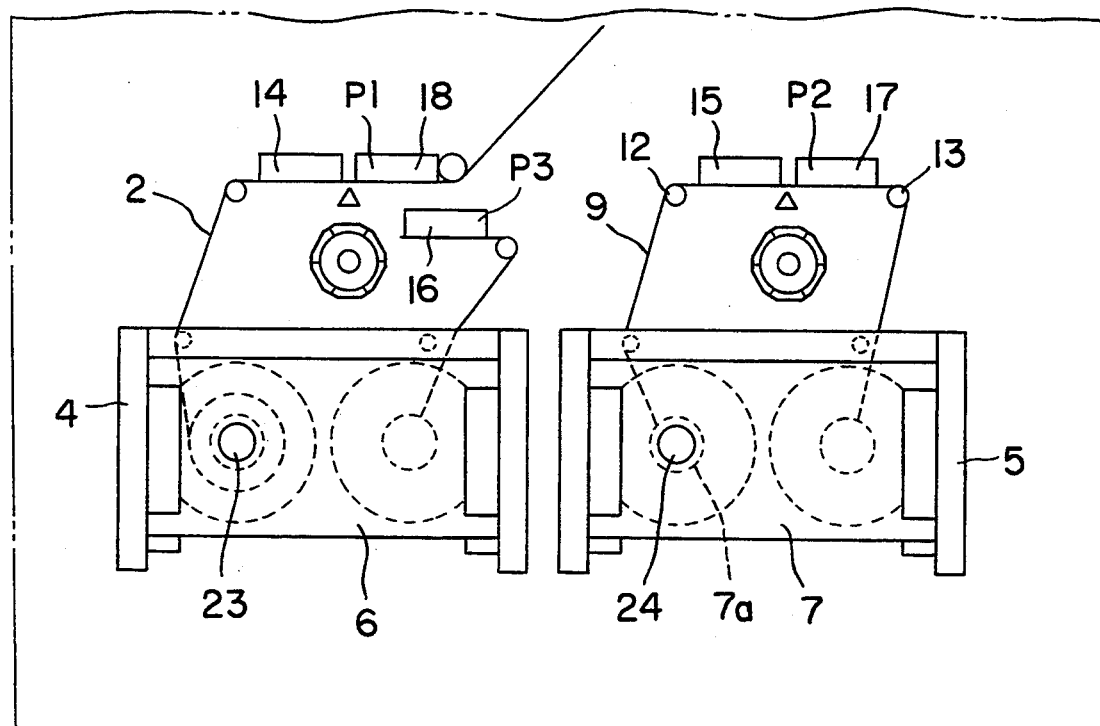
FIG. 5 is still another view illustrating operation of the present invention.

While magnetic tape 2 is being wound into cassette 6, cassette holder 5 has another cassette 7 supplied therein. In the same way as cassette 6 above, leader tape 9 of cassette 7 is pulled out, and tape winding shaft 24 engages hub 7a (FIG. 5).

Leader tape 9 is pulled out, attracted and held by fixed block 15 and sliding block 17 at position P2 to be cut. Sliding block 17 is moved to position P4 while leader tape 9 is held.

Figure 6:
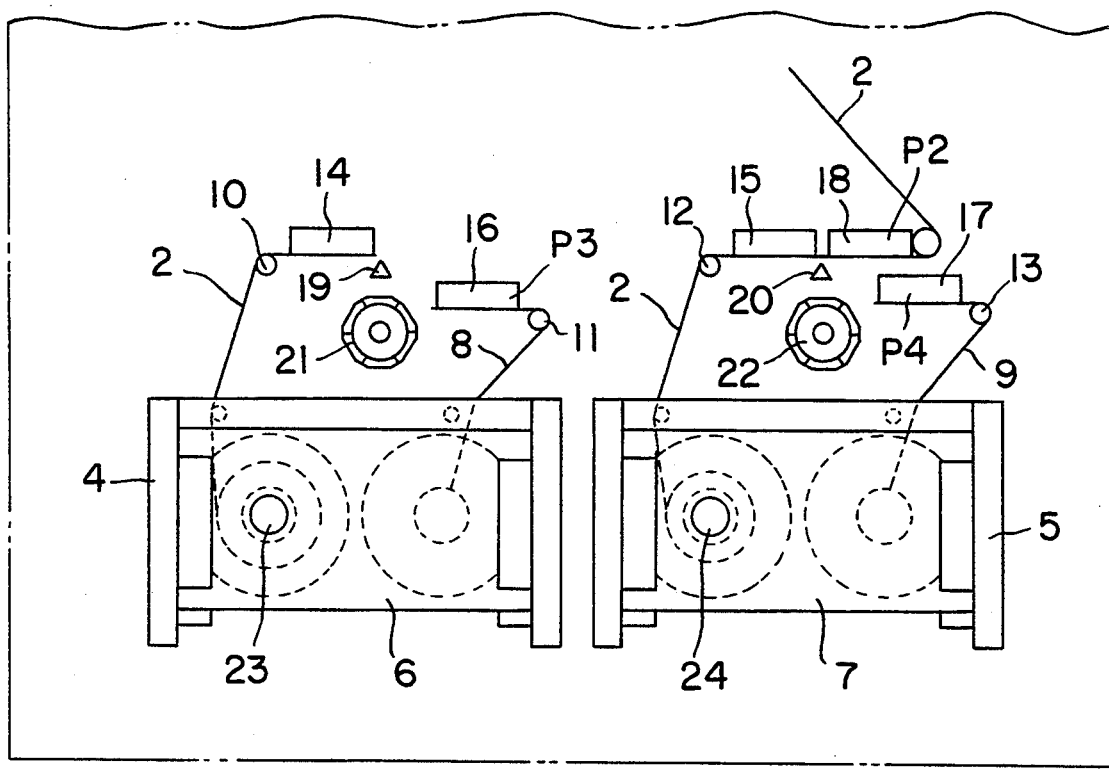
FIG. 6 is still another view illustrating operation of the present invention.

After a predetermined magnetic tape 2 is wound into cassette 6, magnetic tape 2 is again attracted by fixed block 14 and moving block 18, Cutting device 19 cuts magnetic tape 2. Moving block 18 is then moved from position P1 to position P2 while holding the leading end of magnetic tape 2. In the same way, magnetic tape 2 is wound into cassette 7 (FIG. 6).

Figure 7:
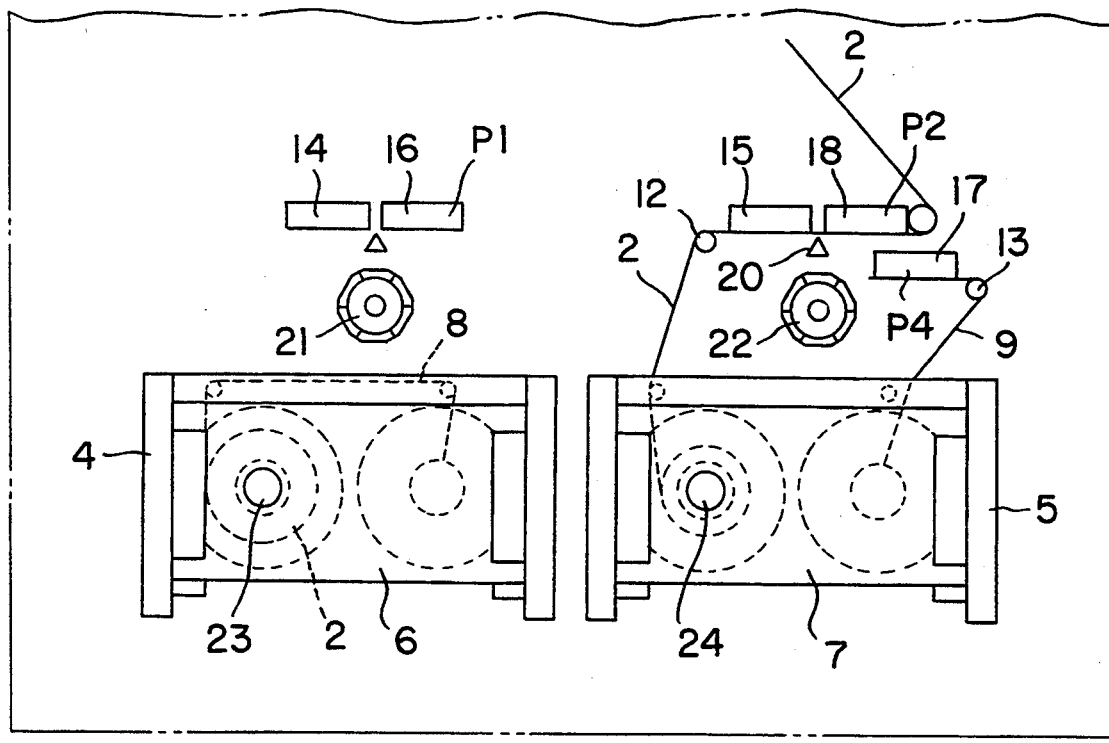
FIG. 7 is still another view illustrating operation of the present invention.

On the other hand, sliding block 16 is again moved to position P1. In turn leader tape 8 on sliding block 16 and magnetic tape 2 on fixed block 14 are spliced together by tape splicing means 21. Fixed block 14 and sliding block 16 then release the attraction to the tape. Tape pull-out rollers 10 and 11 are then moved below the plane of the figure. Tape winding shaft 28 winds leader-tape 8 and magnetic tape 2 into cassette 6 (FIG. 7).

Cassette holder 4 is then moved to the opposite side of base plate B to release tape winding shaft 23 from hub 6b and lid 6a of cassette 6 is closed. Cassette 6 completed as described is discharged from cassette holder 4. In succession, a new cassette is supplied.

As described so far, while one tape winding station is winding the magnetic tape into the cassette, another tape winding station makes preparation and post-processes, such as pulling the leader-tape out of the cassette. This operation is repeated to mass-produce many cassettes.

It will be understood that the present invention is not limited to the specific embodiment hereinbefore discussed but extends to all modifications thereof which will occur to those skilled in the art upon consideration of the general disclosure, illustrative details and the scope of the claims appended hereto.

As an example, the tape winding apparatus of the present invention can be constructed so that it can manufacture any audio tape cassette having no lid, while the apparatus of the embodiment described above is for fabricating a video tape cassette having a lid. To accomplish this, only the arrangement for pulling out the leader tape needs to be changed. The exposed leader tape, for example, is sucked out of the cassette before being placed on a fixed block by an arm or the like. In this way, the tape winding apparatus of the present invention can be constructed to fabricate various types of cassettes.

As another example, the tape winding apparatus of the present invention can be constructed so that it can have three or more cassette holders as tape winding stations provided on the same plane, while the apparatus of the embodiment described above has only two cassette holders.

What is claimed is:

1. A tape winding apparatus for winding a working tape into cassettes retained in a tape cassette holding and winding stations comprising; a plurality of said holding and winding stations being positioned in substantially the same plane; a fixed block and a sliding block at each of said plurality of holding and winding stations; tape leader pulling means for pulling a leader tape out of a cassette held in one of said plurality of tape cassette holding and winding stations; tape cutting means for cutting said leader tape; splicing means splicing the cut end of said leader tape with a leading end of said working tape; a movable block means movable from one of said plurality of tape holding and winding stations to another of said tape holding and winding stations to selectively supply said working tape to said splicing means; winding means for winding said working tape into said cassette; whereby said working tape may be spliced to said leader tape and wound into said cassette while another cassette is being prepared.

2. A tape winding apparatus for loading working tape into a cassette comprising; a plurality of tape cassette holding and winding stations; tape leader pulling means for pulling a leader tape out of a cassette held in each of said plurality of tape cassette holding and winding stations; leader tape holding means for holding said leader tape; tape cutting means for cutting said leader tape; moving means movable from one of said tape cassette holding and winding stations to another to selectively move a leading end of said working tape to a position adjacent the cut end of said leader tape; splicing means for splicing the end of said working tape to the cut end of said leader tape; winding means for winding said tape leader and spliced working tape into said cassette; whereby said working tape may be spliced to said leader tape and wound into a cassette at one tape cassette holding and winding station while a cassette at another tape cassette holding and winding station is being prepared.

3. The tape winding apparatus according to claim 2 wherein said leader tape holding means comprises a fixed block and a sliding block at each of said plurality of tape cassette holding and winding stations; said moving means comprising a movable block for moving a leading end of said working tape from one of said plurality of holding and winding stations to another to splice said leading end of said working tape to the cut end of said leader tape held by said fixed block.

* * * * *